US010361880B1

(12) United States Patent
Marcinkowski et al.

(10) Patent No.: US 10,361,880 B1
(45) Date of Patent: *Jul. 23, 2019

(54) CONTROLLING ACCESS TO ONE OR MORE ROOMS USING A MODULAR INTELLIGENT DOOR AND FRAME

(71) Applicant: EDST, LLC, Lubbock, TX (US)

(72) Inventors: Dave Marcinkowski, Lubbock, TX (US); Thomas Mandry, Lubbock, TX (US)

(73) Assignee: EDST, LLC, Lubbock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,478

(22) Filed: Sep. 10, 2018

Related U.S. Application Data

(63) Continuation of application No. 15/881,641, filed on Jan. 26, 2018.

(51) Int. Cl.
| G05B 15/02 | (2006.01) |
| H04L 12/28 | (2006.01) |
| H04N 7/18 | (2006.01) |
| G06K 9/00 | (2006.01) |
| G07C 9/00 | (2006.01) |

(52) U.S. Cl.
CPC ........... *H04L 12/282* (2013.01); *G05B 15/02* (2013.01); *H04N 7/188* (2013.01); *G06K 9/00288* (2013.01); *G07C 9/00134* (2013.01)

(58) Field of Classification Search
CPC ... G05B 15/02; H04L 12/282; H04L 12/2825; H04W 12/08; H04W 12/06; H04W 4/70; H04W 12/04

USPC ..................................................... 700/275
See application file for complete search history.

(56) References Cited

U.S. PATENT DOCUMENTS

| 2015/0120015 | A1 | 4/2015 | Fadell et al. |
| 2016/0203703 | A1* | 7/2016 | Graeve ................. G08B 25/10 455/404.1 |
| 2016/0284206 | A1* | 9/2016 | Boettcher ............ G08B 29/185 |
| 2016/0350988 | A1* | 12/2016 | Malhotra ........... G07C 9/00174 |
| 2016/0364972 | A1 | 12/2016 | Torti |
| 2017/0011570 | A1 | 1/2017 | Johnson et al. |
| 2017/0316661 | A1 | 11/2017 | Modi et al. |
| 2018/0025562 | A1 | 1/2018 | Chen |
| 2018/0040182 | A1* | 2/2018 | Malhotra ........... G07C 9/00174 |
| 2018/0270276 | A9* | 9/2018 | Logue ................. H04L 12/2818 |
| 2018/0330589 | A1* | 11/2018 | Horling ............. G08B 13/1672 |

OTHER PUBLICATIONS

International Search Report and Written Opinion issued for PCT Application No. PCT/US2019/015157, dated Apr. 3, 2019, 10 pages.

* cited by examiner

*Primary Examiner* — Chun Cao
(74) *Attorney, Agent, or Firm* — Norton Rose Fulbright US LLP

(57) ABSTRACT

A modular door and frame that can be manufactured and supplied to end users with various combinations of intelligent features. The intelligent features allow functions to be performed by the door and/or frame. Also, conditions or events to be detected and monitored at the intelligent door and/or remote locations. Data relating to the various functions, events, or conditions can be communicated across a network that is communicatively coupled to the door.

12 Claims, 10 Drawing Sheets

CONTROLLING ACCESS TO ONE OR MORE ROOMS USING A MODULAR INTELLIGENT DOOR AND FRAME

CROSS-REFERENCE TO RELATED APPLICATIONS

The present application is a continuation of U.S. patent application Ser. No. 15/881,641, filed Jan. 26, 2018, and entitled "MODULAR INTELLIGENT DOOR AND FRAME", the disclosures of which are hereby incorporated herein by reference in their entirety.

TECHNICAL FIELD

The present disclosure is generally directed to an intelligent door and frame that perform functions in response to detected conditions or events. Specifically, the present disclosure is directed to an intelligent door and frame that perform functions and communicate both input and output data across a network in response to the detected conditions or events.

BACKGROUND

A door, being the main point of entry to an occupied space (e.g., a home, business, office, and the like), has traditionally served as a barrier or means of security for the occupied space. However, efforts have recently been made to introduce automation or certain functionality in home appliances including, to a limited extent, doors. These "intelligent" appliances are meant to improve, e.g., heating and cooling efficiency, security, visibility into operation, and the like.

For example, certain doors can include an automated lock, where a key pad allows a user to unlock the door via a key code rather than a key. Nevertheless, while certain doors leverage technology to improve convenience and accessibility, much is left to be desired. Currently available technologies that can be advantageously implemented in a door are separately manufactured, unable to efficiently communicate with one another, and unable to be managed by a common access point (e.g., a common application or network node). Further, many of the available components are battery powered and, as a result, require periodic replacement or recharging. Otherwise, the components must be hardwired into areas near the door. This presents obstacles in several instances and makes it difficult to install intelligent doors and/or components in a previously built-out space.

The foregoing problems are exacerbated by the fact that components required to provide "intelligent" functionality in a door are typically manufactured by different companies. As a result, a user looking to improve a door with intelligent functionality is forced to install each component separately, which is time-consuming and tedious. Also, the components comprise different of proprietary software and communication protocols, which are often incompatible with one another. Further, the components are associated with distinct branding, which creates a piecemeal appearance that is aesthetically unpleasing and discourages consumer adoption. It naturally follows that technologies relating to intelligent doors should be improved.

BRIEF SUMMARY OF THE INVENTION

Embodiments herein disclose a method for controlling access to one or more rooms using an intelligent door that operates in response to instructions received from one or more users having different access credentials. Example methods detect, using a first intelligent door sensor, an event or condition in proximity to the intelligent door and comparing the detected event or condition to a set of stored rules, the set of stored rules defining one or more functions to be performed by the intelligent door in response to the detected event or condition. In response to the comparing, example methods perform the one or more functions, including but not limited to, transmitting a notification of the detected event or condition to a first user having first access credentials, transmitting a notification of the detected event or condition to a second user having second access credentials, actuating the intelligent door to an unlocked position for a predetermined period of time, and transmitting an instruction to a second intelligent door sensor to perform a predefined function.

Example systems include an intelligent door for controlling access to one or more rooms that operates in response to instructions received from one or more users having different access credentials. Systems include one or more sensors that detect an event or condition in proximity to the intelligent door and a memory that stores a set of rules. The set of stored rules define one or more functions to be performed by the intelligent door in response to the detected event or condition. Example systems further include a processor that compares the detected event or condition against the set of rules, where in response to the comparing, the processor performs at least one of the one or more functions. The one or more functions comprise a transmitter transmitting a notification of the detected event or condition according to a first user having first access credentials; the transmitter transmitting a notification of the detected event or condition according to a second user having second access credentials; an actuator unlocking the intelligent door for a predetermined period of time; and a second intelligent door sensor performing a predefined function.

Embodiments herein also disclose methods for controlling access to one or more rooms using an intelligent door that operates in response to instructions received from one or more users having different access credentials, where the methods configure, by a central node operated by a property manager, an intelligent door processor to detect an event or condition in proximity to the intelligent door. The central node is communicatively coupled to the intelligent door and to a property manager device via a remotely distributed network. Further, methods receive, at the central node, an indication from the intelligent door indicating that the event or condition has been detected. In response to the indication, methods transmit a notification comprising indications that the event or condition has been detected to an application executing on the property manager device. Further, the central node receives a command from the property manager device, where the command comprises at least one of: a command instructing the intelligent door to unlock at least one lock of the intelligent door, a command to alert one or more occupants of the one or more rooms, and a command to activate at least one recording device for a certain period of time.

Example systems for controlling access to one or more rooms using an intelligent door that operates in response to instructions received from one or more users having different access credentials include a central node, controlled by a property manager, that configures an intelligent door processor to detect an event or condition in proximity to the intelligent door. The central node is communicatively coupled to the intelligent door and to a mobile property manager device via a remotely distributed network.

Example systems also include a receiver, at the central node, that receives an indication from the intelligent door indicating that the event or condition has been detected. In response to the indication, a transmitter sends, to an application executing on the mobile property manager device, a notification comprising indications that the event or condition has been detected. The receiver further receives a command from the mobile property manager device, where the command comprises at least one of: a command instructing the intelligent door to unlock at least one lock of the intelligent door, a command to alert one or more occupants of the one or more rooms, and a command to activate at least one recording device for a certain period of time.

Embodiments herein also disclose methods for controlling access to one or more rooms using an intelligent door that operates in response to instructions received from one or more users having different access credentials. The methods include configuring an intelligent door processor to perform a first routine in response to detection of a first event or condition. The first routine is defined by a first user having first access credentials. The methods also configure the intelligent door processor to perform a second routine in response to detection of a second event or condition. The second routine is defined by a second user having second access credentials. Further, a notification is received from the intelligent door processor of performance of the first routine in response to detection of the first event or condition by the first user, or of performance of the second routine in response to detection of the second event or condition by the second user.

Example systems for controlling access to one or more rooms using an intelligent door that operates in response to instructions received from one or more users having different access credentials also comprise a central node, controlled by a first user according to the first access credentials and accessible by a second user according to second access credentials. The central node configures an intelligent door processor to perform a first routine in response to detection of a first event or condition. The first routine is defined by the first user. The central node further configures the intelligent door processor to perform a second routine in response to detection of a second event or condition. The second routine is defined by the second user. The system also includes a receiver that receives a notification from the intelligent door processor of performance of the first routine in response to detection of the first event or condition by the first user, or of performance of the second routine in response to detection of the second event or condition by the second user.

The foregoing has outlined rather broadly the features and technical advantages of the present invention in order that the detailed description of the invention that follows can be better understood. Additional features and advantages of the invention will be described hereinafter which form the subject of the claims of the invention. It should be appreciated by those skilled in the art that the conception and specific embodiment disclosed can be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE FIGURES

For a more complete understanding of the present invention, reference is now made to the following descriptions taken in conjunction with the accompanying figures, in which.

DETAILED DESCRIPTION

Embodiments described herein provide a modular door and frame that can be manufactured and supplied to end users with various combinations of intelligent features. The intelligent features allow novel functions to be performed by the door and/or frame. Also, conditions or events to be detected and monitored at the intelligent door and/or remote locations. Data relating to the various functions, events, or conditions can be communicated across a network that is communicatively coupled to the door. For example, certain information (visual or otherwise) relating to the door's surrounding environment can be communicated to one or more nodes in a network such as, e.g., a resident, tenant, or property manager, etc.

As such, a resident, tenant, or property manager (referred to herein as a "user") can receive diagnostic information, monitor certain conditions, and/or instruct that certain functions be performed from a local or remote node in a network. Advantageously, a user can monitor conditions and events, and execute operations in response to information communicated from the intelligent door. The intelligent features provided by described embodiments lend themselves to being utilized in a smart city or the like, where appliances and other devices are intelligently connected to one another and managed from a single or shared platform, thereby maximizing efficiency through their coordinated operations.

Further, the intelligent door components are themselves modular. As such, each component can be easily removed and/or replaced as needed. Also, this allows the arrangement of components to be reconfigured to allow, for example, an intelligent door to be switched between a right-hand door orientation and a left-hand door orientation. This also allows for more efficient packaging, shipment, and installation.

Figure 1:
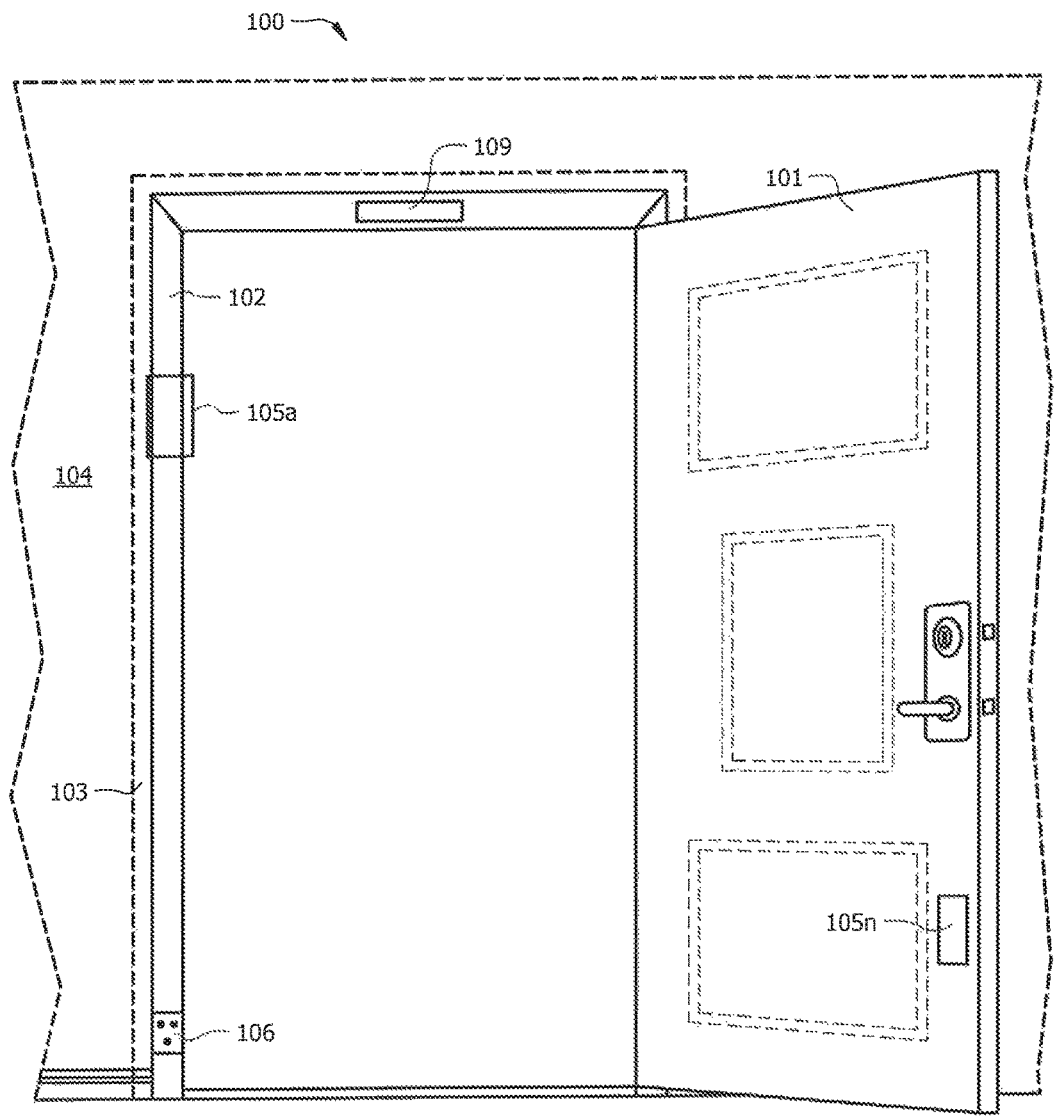
FIG. 1 illustrates certain aspects of an intelligent door system according to described embodiments.

FIG. 1 illustrates certain aspects of intelligent door system 1 Specifically, FIG. 1 illustrates a perspective of intelligent door system viewed from inside a room looking outward. It is envisioned that intelligent door system can provide a doorway to or within a residence, office, business, hotel, multi-family building, or any number of structures. Accordingly, intelligent door 101 can be an exterior door, an interior door, a door in a breezeway, or the like.

Intelligent door system comprises intelligent door 101, and in some instances, intelligent door frame 102. According to different embodiments, intelligent door 101 can be a stand-alone product, including the features and functionality described herein. In other embodiments, certain components and/or functionalities can be included in both intelligent door 101 and intelligent door frame 102. In those instances, the door and frame combination can be installed as a modular unit.

Referring to the embodiment illustrated at FIG. 1, intelligent frame 102 can be installed within, e.g., predefined rough opening 103 in wall 104, which, as known in the art, includes structure to support door 101 therein and allow it to actuate between an open and closed position.

As illustrated, intelligent door system includes one or more processors 105 ($105_a$-$105_n$), components of which can be included in intelligent door 101, intelligent frame 102, or distributed across both. Processor(s) 105 can included in a HUB or smart HUB and can be powered by and communicate using various wireless protocols and/or internal wiring (e.g., electrical, cable, fiber optic, Ethernet, Cat5 cable, Cat5e cable, Cat6, and the like) in wall 104. As such, intelligent door frame 102 can include connector 106, which can function to provide power to and communication between intelligent door components and other network nodes. According to embodiments, intelligent frame 102 can be hardwired into a building's electrical system such that electrical wiring is hidden inside walls. Such a configuration not only improves the intelligent door system's aesthetics but also prevents disconnection of a power source by accident or by a nefarious entity.

Additionally or alternatively, intelligent frame 102 can include an inductive or automatic electrical coupling mechanism, e.g., different embodiments of connector 106, that mate with a corresponding electrical coupling mechanism of intelligent door 101. For example, an electrical mating between door 101 and frame 102 can involve a male-female coupling. In other embodiments, connector 106 can be an induction plate, where intelligent components in door 101 are inductively charged when door 101 is in a closed position (i.e., where induction plates on the frame and door act in concert to transfer charge to the intelligent components).

Processor(s) 105 can communicate data, including data comprising instructions or routines, data relating to detected events or conditions, diagnostic data, sensor data (e.g., video footage, temperature/humidity history, etc.), between network components via router 109. Router 109 can be housed within door 101, frame 102, or another location and communicate across a communication network (e.g., communication network illustrated in FIG. 6A and FIG. 6B).

Figure 2:
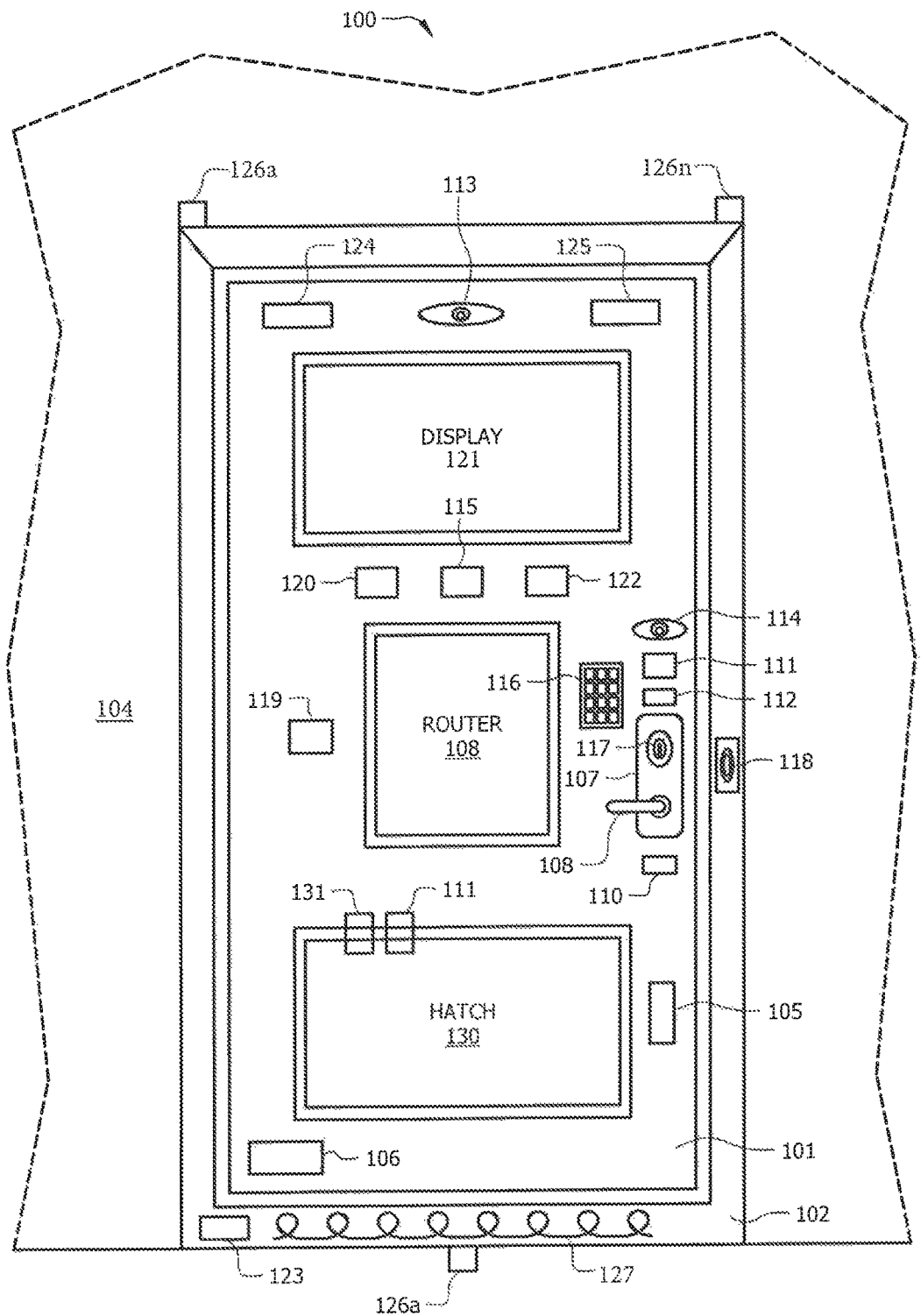
FIG. 2 illustrates additional aspects of an intelligent door system according to described embodiments.

FIG. 2 illustrates additional details of an intelligent door system according to described embodiments, such as intelligent door system illustrated at FIG. 1. Specifically, FIG. 2 shows an exterior view of intelligent door system and, consistent with the foregoing description, intelligent door system includes intelligent door 101 and intelligent frame 102, which is installed in wall 104.

Intelligent door 101 includes smart lock 107 and handle 108. Smart lock 107 can be controlled by processor(s) $105_a$-$105_n$, such that smart lock 107 can be electronically locked and unlocked according to one or more lock/unlock routines. Smart lock 107 can comprise a latching mechanism that is actuated by processor(s) 105 (e.g., via mechanical control block 506 illustrated in FIG. 5) upon the initiation or triggering of a lock/unlock routine. Additionally or alternatively, smart lock 107 can comprise an electromagnet that is activated and deactivated by processor(s) 105 upon the initiation or triggering of a lock/unlock routine.

A lock/unlock routine is an example of one or more selectable routines (e.g., executable instructions), where processor(s) 105 causes an intelligent component (e.g., a sensor, lock, camera, scanner, etc.) of intelligent door system to perform a function according to certain parameters (e.g., rules) upon detection of an event or condition in proximity to intelligent door 1 An example lock/unlock routine is executable computer instructions that cause processor(s) 105 to automatically lock and/or unlock smart lock 107 upon satisfaction of defined rules.

Figure 6A:
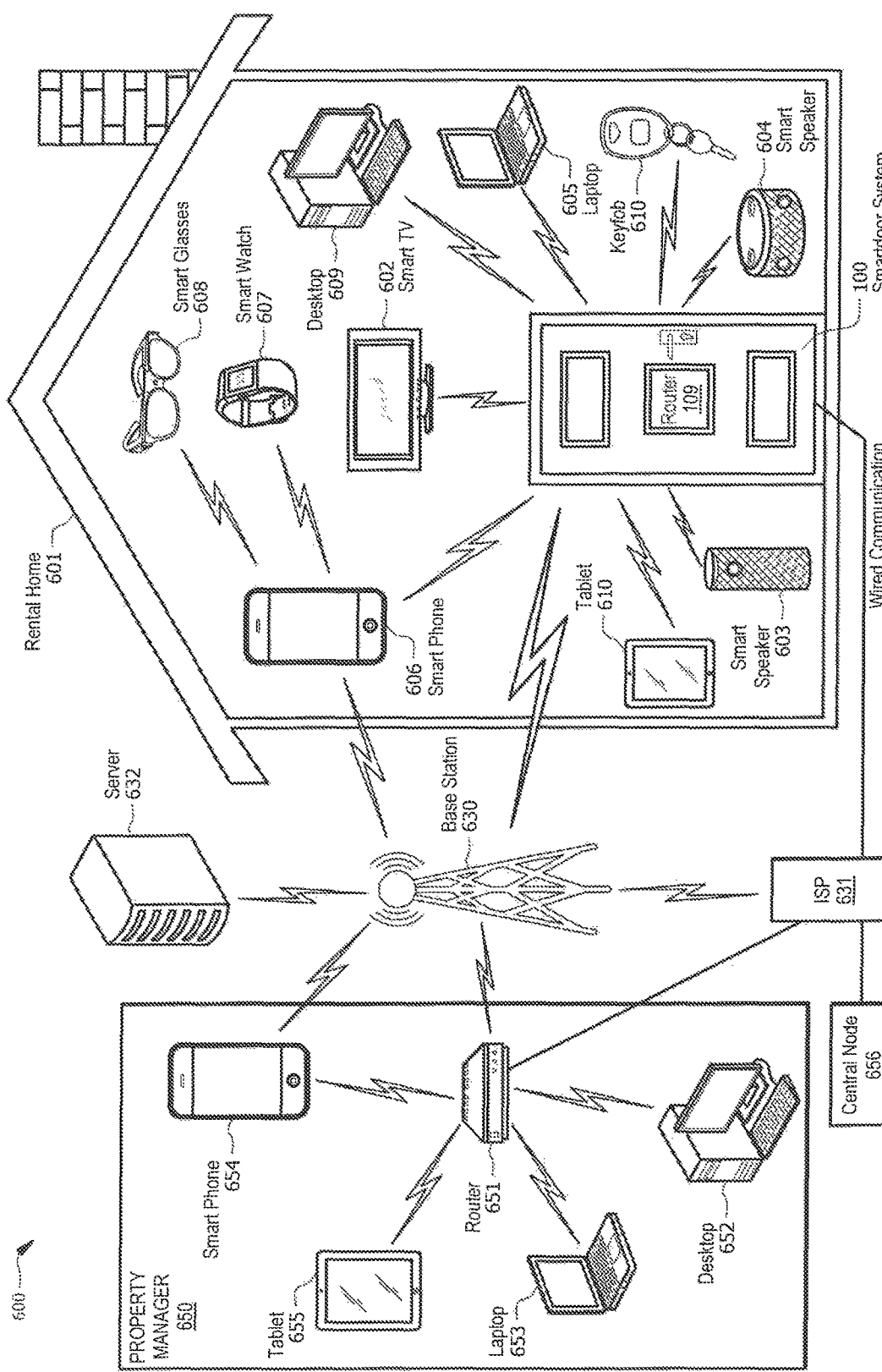
FIG. 6A illustrates certain aspects of a communication network in which an intelligent door system according to described embodiments operates.
Figure 6B:
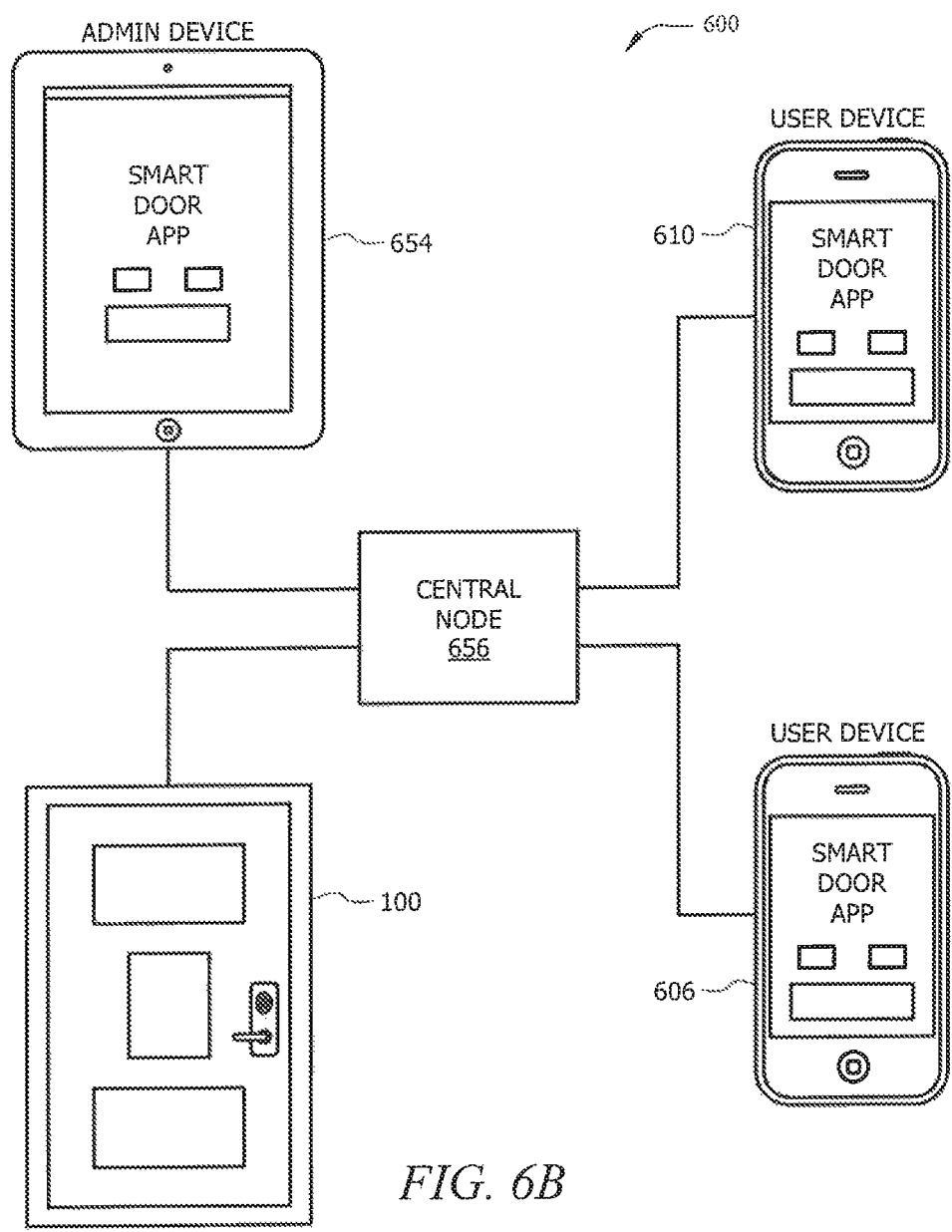
FIG. 6B illustrates additional aspects of a communication network in which an intelligent door system according to described embodiments operates.

According to an embodiment, a user can initiate a user device application that communicates with intelligent door system, e.g., an instance of an application executing on smartphone 606 illustrated in FIGS. 6A and 6B) and select a lock/unlock option provided by the application. In other embodiments, a lock/unlock command can be received from another network node on behalf of a locked-out tenant, a realtor, property manager, service person, and the like.

A proximity for any given sensor can be specified by user preferences or other system requirements. For example, outward facing sensors can be configured to detect an event or condition within a proximity covering the width of a hallway, area (e.g., square footage) of a front porch, or some defined space. By way of further example, inward facing sensors can be configured to detect an event or condition within a proximity covering an area (e.g., square footage) of or more interior rooms. In any event, one or more users can modify sensors to cover different proximities. For instance, a camera can be configured to begin recording when an event or condition is detected within an area (e.g., square footage) of a front porch, where an RFID scanner can be configured to read indicia when an event or condition is detected within, e.g., twelve (12) inches of the RFID scanner. The proximities utilized by different sensors can be configured from default settings by one or more remote users according to customized settings that best fit the environment surrounding the intelligent door.

According to certain aspects, processor(s) 105 can receive a short range wireless communication instruction to perform one or more functions through its communicative coupling with other intelligent door 101 components. Intelligent door 101 can include one or more of Bluetooth transceivers 110, RFID sensors 111, and/or other short range communications devices. Receiving these inputs or instructions can involve detecting one or more short range wireless communications and/or detecting the absence of one or more short range wireless communications of a registered device. The presence or absence of an input or an instruction can itself serve to trigger or initiate a routine, such as a lock/unlock routine (e.g., a hands-free lock/unlock routine), temperature check routine, scanner initiation routine, camera record routine, and the like.

A number of temperature sensors, cameras, or other devices can be communicatively coupled with intelligent door system using a LAN or Wi-Fi connection. Accordingly, intelligent door 101 can communicate with sensors that are on the door itself as well as sensors that are located at some distance from intelligent door 101. For example, intelligent door 101 may receive temperature, humidity, and pressure information from a temperature sensor on the door itself, as well as a temperature sensor located in one or more rooms. By way of further example, intelligent door 101 can detect flooding at door 101 (where e.g., moisture sensor 123 is located on intelligent door 101) or at another location in a space (where e.g., moisture sensor 123 is located below a kitchen sink). It follows that, e.g., one or more cameras 113 can be on intelligent door 101 or remote therefrom. Accordingly, one or more cameras 113 can be placed at different points of entry, e.g., certain gates, driveway entrances, and the like, to communicate information to processor(s) 105. In either case, a wired or wireless communication protocol can be used to communicate information relating to a condition from some area within a space to processor(s) 105, which can then take different actions in response to that information.

A registered device can be a device that is pre-registered for one or more routines (e.g., one or more smartphones, key fobs, RFID cards/fobs, vehicle short range communication systems, and the like). One or more users can register one or more devices using an instance of a user device application. For example, a user can pair a smartphone with intelligent door system using a Bluetooth pairing procedure. Other user devices can be registered with intelligent door system over a cellular network by transmitting predefined access credentials, a system password, and the like. Advantageously, an intelligent door system and its intelligent components) can comprise a closed network of, e.g., sensors in an occupied space, sensors on intelligent door 101, and registered device or nodes across a network. This mitigates the chance of a security breach, disclosure of sensitive information, etc.

According to an exemplary embodiment, as a registered user device enters the range of Bluetooth transceiver 110 and/or RFID sensor 111, detection of the registered device can trigger an unlock routine causing processor(s) 105 to actuate an intelligent lock to an unlocked position. Further, if a registered user device exits a range or proximity of Bluetooth transceiver 110 and/or RFID sensor 111, absence of an input can trigger a lock routine causing processor(s) 105 to actuate the intelligent lock to a locked position.

Various selectable lock/unlock routines can be configured according to different parameters. For example, system can be configured to perform operations according to user preferences and/or system requirements. Accordingly, lock/unlock routines can be initiated by detecting a registered user device approaching Bluetooth transceiver 110 from the door's exterior, detecting a combination of registered devices approaching at the same time (e.g., a smartphone and a key fob), and/or detecting that ambient light meets a threshold value. In other words, routines (e.g., lock/unlock routines) can depend upon certain time intervals, as well as the occurrence of certain events.

Further, execution of a routine (e.g., lock/unlock routine) can be initiated upon input from one or more scanners 112. For example, a routine can be initiated when a person presents a scannable key or indicia to, e.g., scanner 112, wide-angle camera 113, or macro camera 114. Embodiments of scannable keys or indicia include but are not limited to a linear barcode, a matrix (2D barcode), a QR code, a code hidden in a picture, and/or other image. A scannable key can be displayed on a screen of a smart device (e.g., smartphone 606 illustrated in FIG. 6), printed on a package (e.g., tracking number), or printed on a wristband, key-ledger, keycard (e.g., agent ID card), and the like. Further, one or more of the sensors, such as scanner 112 can be modified to include a chip reader to read information from a credit card or identification card. The information read from a chip can be utilized to execute a payment contract. For example, a tenant can use the chip reader to pay rent to a property manager or a lease agreement can be electronically executed. The information read from the chip can be transmitted to processor(s) 105 and processed locally, or processor(s) 105 can transmit the information to one or more network nodes for remote processing.

A routine can also be initiated upon receiving input from one or more cameras. Wide angle camera 113 can include a wide-angle lens or fisheye lens, while macro camera 114 can include a macro lens. By operation of both cameras, a user is provided with a broad view of the surrounding environment using wide-angle camera 113, while maintaining the ability to view detailed information presented to macro camera 114 (such as, e.g., package delivery information, personal identification cards, and the like). Some or all of the cameras can be high-resolution cameras and/or be capable of night vision (e.g., IR detection).

One or more images can be used as an input to initiate a routine. For instance, a camera can capture an image of an individual's face or retina that is utilized by a processor having facial recognition and/or retina recognition software. Then, an output from facial or retina recognition software executing on the processor can be used to trigger a routine (e.g., activation of a lock/unlock routine, transmission of a notification to one or more users, transmission of an alert to a service provider). Leveraging facial and/or retina recognition technology, the identify of different individuals can be stored and categorized according to their access credentials or level of access. Accordingly, certain individuals can be prevented from access under all circumstances, where other individuals can be granted access only upon the satisfaction of certain conditions or events.

Schedules, which can be defined by one or more users, can further determine when certain routines will be executed by intelligent door 101 and/or intelligent door frame 102. For example, a scheduled apartment showing, a scheduled delivery, a scheduled maintenance, and the like can trigger a routine. Schedules can automatically load from certain user applications, including scheduling or delivery services (e.g., Microsoft Outlook, Google, Amazon, UPS, FedEx, etc.).

One or more timers can trigger a routine. A timer-based routine can allow a lock to remain unlocked for a determined time period, and upon expiration of the time period, the routine can actuate the lock to a locked position. Also, utilizing one or more timers, diagnostic information or other information-of-interest can be transmitted to other network nodes, where the information can be stored and logged as historical information. In this way, attributes such as room temperature, humidity, electricity usage, can be monitored on a periodic basis. Not only does this enable construction of a historical profile for such attributes, but it allows a user (e.g., a property manager operating at a remote node or a tenant operating a smartphone) to make certain adjustments using intelligent features of system to conserve energy, etc. It should also be appreciated that diagnostic information can include information that relates to the function or operation of system components. If, for example, a mechanical malfunction is detected with an intelligent door lock, a communication error is detected, or measured value (such as temperature) exceeds a threshold value, an error message can be transmitted to an appropriate network node. The error message can be associated with a code or the like that is indicative of the nature of the malfunction. The malfunction can be addressed remotely, if possible, or a service provider can be deployed to address the error.

One or more microphones 115 can also trigger a routine, where voice recognition software supports a list of individuals and their associated access credentials. Microphone 115, in conjunction with recognition software executing on processor(s) 105, can be used with other input devices such as, e.g., keypad 116, to provide redundant input requirements before a lock/unlock routine is executed. In such instances, microphone 115 and keypad 116 can be used in conjunction with one another to enable multi-tier access requirements.

Traditionally, deadbolts provide reinforcement against undesired intrusions. In, e.g., a rental situation, traditional deadbolts often provide tenants privacy from a landlord, where a landlord has a key to a first locking mechanism but does not have a key to the deadbolt. However, according to certain embodiments, system can include intelligent deadbolt 117 that operates concurrently with smart lock 107. Doing so provides additional protection or serves as another tier of granting or denying access.

According to an embodiment, intelligent deadbolt 117 can execute additional and/or different routines to provide some users broader access privileges than others. For example, a tenant can be granted broader access privileges than a property manager, where a tenant has the ability to prevent a property manager from entering the property without consent. In that instance, the tenant has broader access credentials that override the more restrictive access credential granted to the landlord.

On the other hand, there can be circumstances that warrant a landlord and/or a third party being granted broader access privileges than the tenant. In such circumstances, a landlord can create a routine that overrides one or more routines established by the tenant. According to an embodiment, the landlord can initiate a routine (from a network node or application executing on a mobile device) that grants access to the fire department and/or the landlord, regardless of one or more tenant configured routines, in the event of an emergency (e.g., a carbon monoxide detection event). In either case, broader access privileges can be utilized to override other routines that otherwise restrict the operation of smart lock 107 and intelligent deadbolt 117.

Intelligent door system can also include doorbell 118. Doorbell 118 can include and/or be communicatively coupled to other devices such as cameras (113 and 114) and/or motion detector 119, which detects motion near intelligent door system 1 Actuation of doorbell 118 can initiate a routine where a notification is sent to a user device (e.g. smartphone 606 illustrated in FIG. 6A). Further, the input can initiate a routine which triggers one or more cameras to allow a user to see who is at the door, and can initiate a two-way communication between a user device and a person at intelligent door system via microphone 115, speaker 120, camera(s) 113 and 114, and/or external display 121.

Further, it should be appreciated that keypad 116 or doorbell 118 can include a surface for reading fingerprint information of a user trying to access one or more rooms using intelligent door 101. In that instance, fingerprint information can be read by a surface on keypad 116 or doorbell 118, transmitted to processor(s) 105, which can utilize recognition software to grant or deny access based on the fingerprint information. Also, consistent with the foregoing description, the identification made based on the fingerprint information can be used to transmit a notification to a user (e.g., a hotel manager, a property manager, a tenant, or a resident) or an alert to a service provider, should fingerprint information be associated with a person on restricted list.

In embodiments, a person can initiate communication with a user device using external display 121. According to certain aspects, external display 121 can be a touch screen, which offers selections to a person at door 101. A delivery person or a visitor can select a video conference option, and processor(s) 105 can transmit a notice to a user device that a video conference has been requested. A user of the user device can accept the request, where processor(s) 105 can utilize router 109, microphone 115, speaker 120, camera(s) 113 and 114, and/or external display 121 to conduct a video conference. Other selectable options can be offered, including but not limited to, leaving a message, notifying a user device of a delivery and/or service call, scheduling an appointment, inputting credentials to initiate a routine, and the like. Ambient light sensor 122 can adjust brightness of display 121.

Intelligent frame 102 and/or intelligent door 101 can include one or more sensors (e.g., 123, 124 and/or 125) that detect an event or condition within or in proximity to door 101 (e.g., within a given apartment, room(s) in a house, section of an office building, etc.). Other sensors include moisture sensor 123, which detects water on the breezeway and/or within wall 103; atmospheric sensor 124, which can detect heat, smoke, carbon monoxide, and/or dangerous conditions; and temperature sensor 125, which detects ambient temperature and/or humidity.

In certain environments, one or more solar panels can mount to intelligent door 101, intelligent frame 102, and/or connect thereto. One or more rechargeable batteries can provide a main power source and/or a backup power source of intelligent door system 1 Intelligent frame 102 and/or intelligent door 101 can include a built-in battery recharging system that is powered by any of the power sources discussed herein. Also, kinetic energy can be drawn from movement of component parts of the system. As such, door movement, hinge movement, lock movement, and the like can be converted to electrical energy, stored, and later utilized by system components. One or more power sources can power processor(s) 105 and any other component of the intelligent door system, e.g., scanners, cameras, electromagnets, displays, routers, and the like).

As discussed herein, the detection or identification of certain conditions can operate to trigger a routine. According to an embodiment, detection of one or more events or conditions can trigger a recording routine, where one or more cameras and/or speakers record information and transmit the information to a user device, admin device, and/or a server (e.g., server 632 illustrated in FIG. 6). Further, detection of one or more conditions can trigger a notification routine, where a notification is logged and/or sent in real time to a user device, admin device, and/or a server. A threshold sensitivity of one or more sensors can be adjusted (e.g., via an app) according to user preferences and/or system requirements. Further, various combinations of detected conditions and/or thresholds of detected conditions can trigger different routines. According to an embodiment, detection of a certain combination of conditions and/or thresholds of conditions can trigger a user device notification routine, while a different combination of conditions and/or higher thresholds of conditions can trigger an admin device notification routine.

Consistent with the foregoing description, various sensors can be located on intelligent frame 102 and/or intelligent door 101, according to user preferences and/or system requirements. According to an embodiment, one or more sensors can detect conditions that trigger a fire alarm routine. According to a fire alarm routine, processor(s) 105 can transmit a notification to a fire department, a user device, a neighbor's user device, user devices of an entire apartment complex, a property manager device, and the like. Further, sensors and recording devices on intelligent door can record information about the circumstances for analysis and/or diagnostic purposes.

By way of further example, if one or more sensors detect conditions that trigger a flood routine, processor(s) 105 can transmit a notification to a user device, a property manager's device, a plumbing company, and/or a maintenance provider's device. Further, sensors and recording devices on intelligent door can record information about the circumstances for analysis and/or diagnostic purposes. Also, if one or more sensors detect conditions that satisfy an ice routine, then processor(s) 105 can transmit a notification to a user device, a property manager's device, a de-icing company, and/or a maintenance provider's device. Further, in embodiments, door frame 102 includes defroster 127, which can be automatically activated, according to an ice routine, to melt ice off the breezeway. Defroster 127 can comprise a heating mechanism (e.g., heat coil, heat plate, heated air, and the like).

As previously mentioned, intelligent door system can also include electrical connector 106. Connector 106 provides a means to power and/or charge intelligent door 101 and/or frame 102 from an exterior source, perhaps within wall 104. Such a feature can be useful when an apartment is vacant, a tenant forgets to use an interior electrical input, a hardwiring malfunction occurs, as a backup system, and the like. If desired, intelligent door system can include one or more coupling mechanisms, e.g., mounts $126_a$-$126_n$ that allow a cover to be mounted over intelligent door system 1. A cover (not shown) can provide protection to intelligent door system when desired, and in embodiments, can lock in place. In embodiments, a user can mount the cover while painting wall 103 or conducting other maintenance, where the cover protects intelligent door system from paint splatter and/or other damage. A cover can also be used during a hail storm, hurricane, and/or other inclement weather.

Intelligent door 101 can include one or more hatches 130. Hatch 130 can actuate between one or more open positions and closed positions. Further, hatch 130 can actuate between one or more locked states and unlocked states manually and/or according to one or more lock/unlock routines. Hatch 130 can provide controlled access through door 101 independently of the position and/or locked state of door 101. According to an embodiment, when door 101 is closed and locked, hatch 130 can be used for receiving deliveries and allowing entry of ambient light. Lock/unlock routines of hatch 130 can utilize inputs from router 109 using a communications network (e.g., network illustrated in FIG. 6), Bluetooth 110, RFID sensor 111, scanner 112, cameras 113 and 114, keypad 116, and the like. Additionally or alternatively, lock/unlock routines of hatch 130 can utilize input from dedicated input devices, including but not limited to hatch camera 131 and hatch RFID sensor 111.

Figure 3:
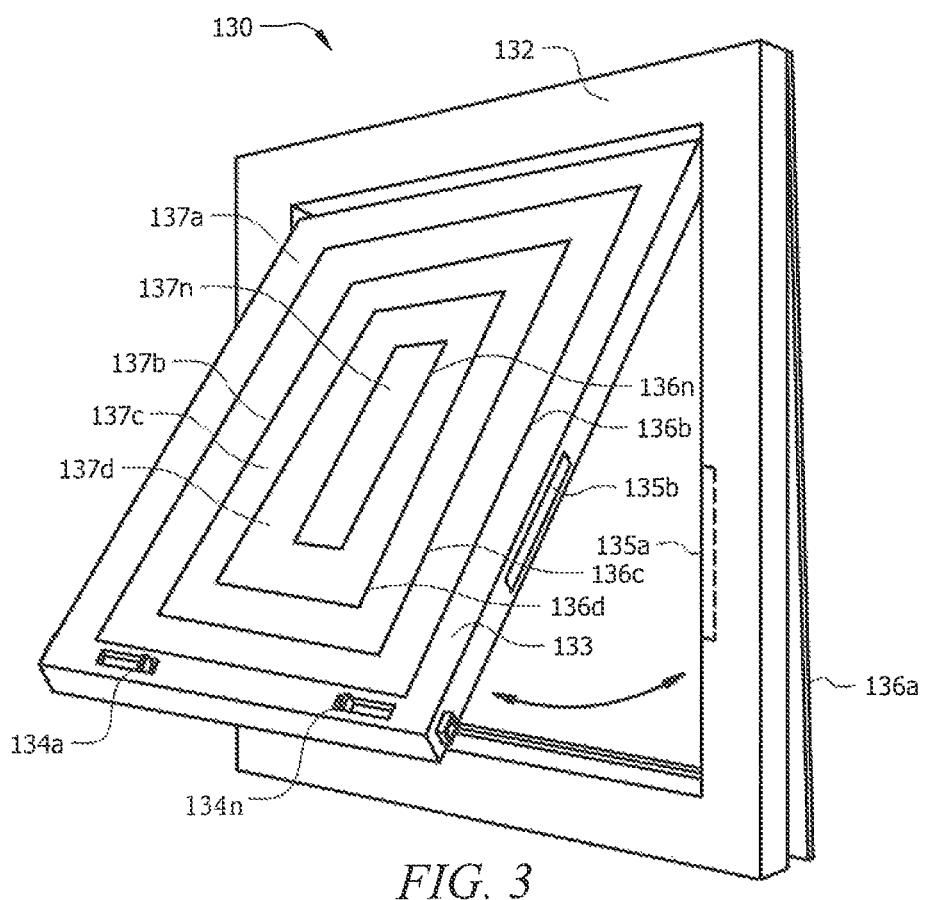
FIG. 3 illustrates certain aspects a hatch feature of an intelligent door system according to described embodiments.

FIG. 3 shows certain aspects of hatch 130, which can be implemented with an intelligent door system as described herein. Hatch 130 includes hatch frame 132 that supports hatch door 133. Hatch frame 132 secures hatch 130 to intelligent door 101. FIG. 3 shows an embodiment of hatch 130 being located towards the bottom-center of door 101. However, in embodiments, hatch 130 can be located anywhere within door 101 including, but not limited to, near the top, bottom, center, right, left, portions of door 101. Hatch 130 can be utilized to accept delivery of packages, used by trash collection services, dog walking services, and the like, to provide limited access using intelligent door 101 without fully unlocking the intelligent door. In this way, services can be enjoyed by a resident or tenant without sacrificing security.

Hatch door 133 can couple to hatch frame 132 via one or more coupling mechanisms (e.g., hinges) and include a number of manual locks at different locations. In the illustrated embodiment, manual locks $134_a$-$134_n$ slide a lock (e.g., pin) into hatch frame 132. Hatch 130 can include one or more automatic locks that can be controlled locally and/or remotely.

Hatch frame 132 can include one or more electromagnetic plates $135_a$-$135_n$ that pair with one another. When in the locked state, electromagnet plate $135_a$ can be activated such that it magnetically attracts electromagnetic plate $135_b$, and the attraction prevents hatch door 133 from being opened. When in the unlocked state, electromagnetic plate $135_a$ can be deactivated such that electromagnetic plate $135_b$ is not attracted to electromagnetic plate $135_a$, and hatch door 133 can be opened. Further still, if desired, electromagnet plates $135_a$ and $135_b$ can automatically open and/or close hatch 130. According to an embodiment, electromagnetic plate $135_a$ can be activated such that electromagnet plate $135_a$ magnetically repels electromagnetic plate $135_b$, and the repelling force actuates hatch door 133 to an open position. Conversely, electromagnetic plate $135_a$ can be activated such that it magnetically attracts electromagnetic plate $135_b$, and the attraction can pull hatch door 133 from an open position to a closed position. It is understood that an electromagnetic lock as described above can be incorporated into smart lock 107, if desired.

Hatch door 133 can have a dynamically controllable size. According to an embodiment, hatch door 133 can comprise a plurality of rims ($137_a$-$137_n$) that work together to dynamically change the dimension of hatch 130. In the illustrated embodiment, hatch door 133 comprises five rims: largest rim $137_a$, second largest rim $137_b$, third largest rim $137_c$, fourth largest rim $137_d$, and smallest rim $137_n$. Rim $137_n$ is a solid rim having no opening there through. Each rim locks into its immediately larger rim. According to an embodiment, rim $137_n$ locks into rim $137_d$, which locks into rim $137_c$, which locks into rim $137_b$, which locks into rim $137_a$.

When rim $137_a$ locks into rim $137_d$, interface $136_n$ is located between the outer depth surface face (z-axis) of rim $137_n$ and the inner depth surface face (z-axis) of rim $137_d$. Rim $137_a$ can lock into rim $137_d$ via a manual and/or automatic locking mechanism located at interface $136_n$. Any locking mechanism can be employed. One or more locking mechanisms can be located at some or all of interfaces $136_a$-$136_n$. One or more of the locking mechanisms can be individually controlled and can be locally and/or remotely controlled. The system can control one or more of the interface locking mechanisms in order to dynamically adjust the size of hatch door 133. As a result, if a large object needs to be placed through hatch 130, system 101 allows the interface between rim 137$_a$ and hatch frame 132 to be modified, thereby allowing access through a large hatch opening. In another embodiment, if a small object needs to be placed through hatch 130, system allows a user to unlock interface 136$_n$ while keeping other interfaces locked, allowing small objects to pass while preventing large objects from doing so. In sum, hatch 130 can have a dynamically changing size that is locally and/or remotely controlled. Further, any portion of hatch 130 can be opened, closed, locked, and/or unlocked manually and/or according to one or more routines.

I-latch door 133 can also be activated in response to input from scanners, cameras, schedules, microphones, interactive displays, and/or sensors. A user can configure a lock/unlock routine for deliveries and/or select any combination of parameters such as scanning a tracking number, determining a schedule delivery period of time, determining a package size (via tracking information and/or camera input), receiving input via a keypad and/or short range wireless device, and the like, to create a hatch lock/unlock routine that unlocks a dynamic size of hatch 133. Further, a user can configure a hatch lock/unlock routine by selecting the same or different parameters such as voice recognition, ID scanning, and/or determining a dog walking schedule. A hatch lock/unlock routine can be configured to be accompanied by a recording routine, logging routine, and/or notification routine.

Figure 4:
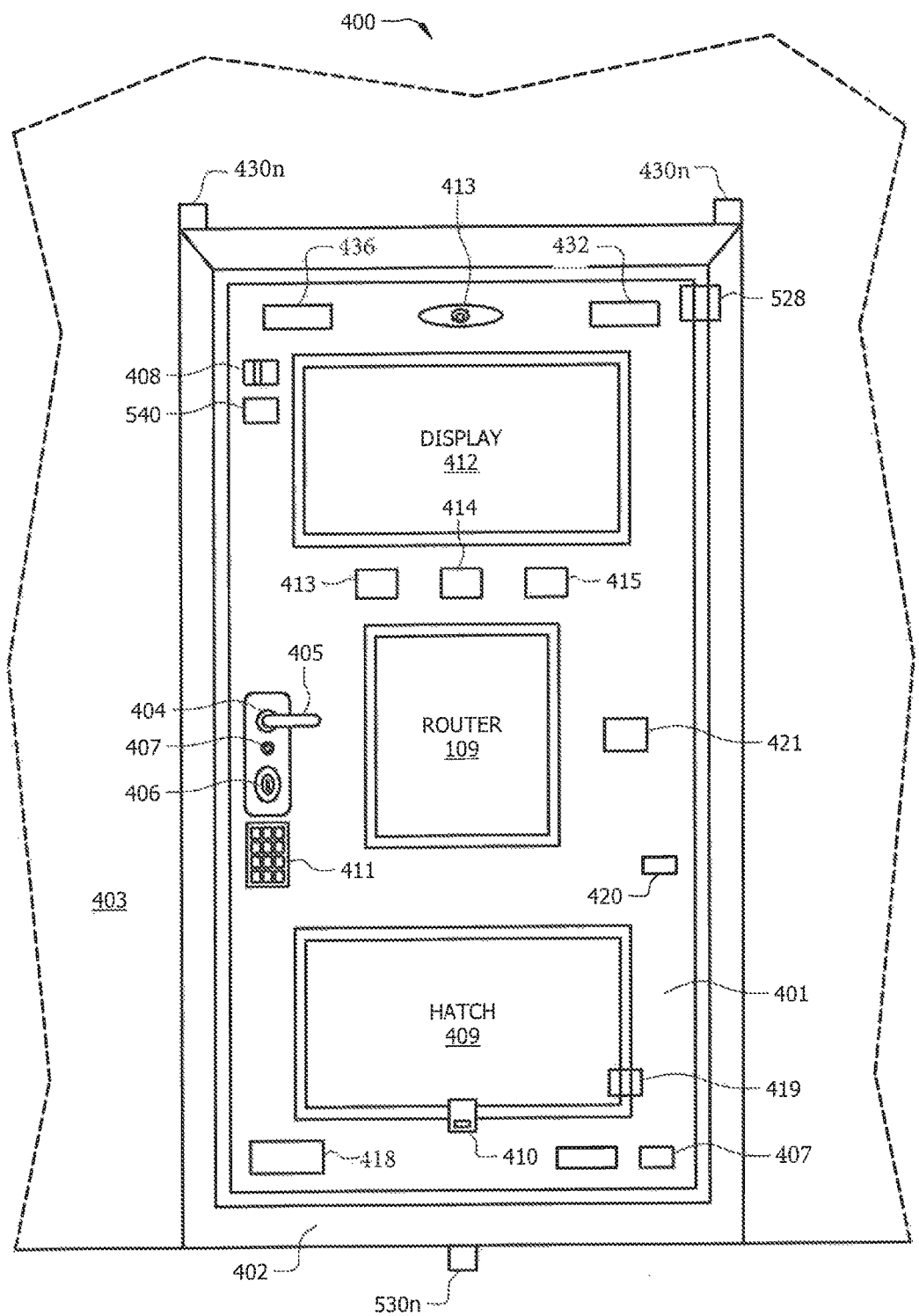
FIG. 4 illustrates additional aspects of an intelligent door system according to described embodiments.

FIG. 4 shows an interior view of an intelligent door system according to described embodiments. Intelligent door system includes intelligent door 401 and intelligent frame 402, which is mounted in wall 403.

Intelligent door 401 can include smart lock 404, handle 405, and intelligent deadbolt 406, which can operate as described above. Intelligent door 401 can also include one or more push button locks 407, which actuates smart lock 404 and/or intelligent deadbolt 406 once depressed. Further, smart lock 404 and/or intelligent deadbolt 406 can be operated manually via a key and/or other turning mechanism. Further still, intelligent door system can include a child lock 408, which can be controlled automatically according to a lock/unlock routine and/or manually. Intelligent door 401 can include hatch 409 having an optional internal manual lock 410.

A user can interface with a security alarm via keypad 411 and/or display 412, which can be a touch screen. A user and/or administrator can further interface with a security alarm via an application on a user device and/or admin device. A user can set an alarm to one or several states, including but not limited to, on-while-away, on-while-home, off, and the like. Various states of an alarm setting adjust whether a detected event is expected or unexpected. Based at least on the occurrence of an expected event, processor(s) 105 can perform a routine (e.g., log routine, notification routine, and the like). Based at least on the occurrence of an unexpected event, in addition to processor(s) 105 performing the routines above, processor(s) 105 can perform additional routines that notify additional people/services. According to an embodiment, a service provider (e.g., police department, fire department, monitoring company, emergency plumbing service, etc.) can trigger interior and/or exterior recording devices (camera 413, microphone 414, and the like), an audible alarm using speaker 415, a visual alarm (e.g., lights) using internal display 412 and/or an external display, and a tactile alarm, according to user preferences or system configurations.

Based on the alarm's current setting, certain events are classified as expected or unexpected. The classification of events is dynamically configurable by a user and/or property manager using an application or interfacing via display 415. According to an embodiment, the alarm system can be configured such that when the alarm is in the off state, all of the entrances are expected to open and motion is expected to be detected inside. Further, the alarm system can be configured such that when the alarm is in the on-while-home state, motion is expected to be detected inside but none of the entrances are expected to open, except according to lock/unlock routines performed by processor(s) 105. Further still, the alarm system can be configured such that when the alarm is in the on-while-away state, no motion is expected inside and none of the entrances are expected to open, except according to lock/unlock routines performed by processor(s) 105. Each of the sensors can be configured according to user preferences and/or system requirements, and the processor's response to an unexpected event can be dynamically defined in real time. As such, when a user is leaving town, the user can configure a routine to contact an emergency plumbing service upon detection of water, but the user can remove this response while the user is in town.

In embodiments, display 415 (e.g., touch screen) can provide user interaction with intelligent door system via a graphic user interface (GUI). According to an embodiment, display 415 can provide selectable options from which a user can configure processor(s) 105 and the functionality thereof. Display 415 can also function as a touch screen responsive to, e.g., a stylus or the like, such that written messages, signatures, etc. Further, display 415 can provide the user a view of the exterior as seen through exterior cameras. Intelligent door system can include light sensors 421 that control interior display 415, exterior display 416, interior lights, exterior lights, and the like. Further, intelligent door system can include a thermostat 422 that controls the climate within the residence. Data collected by light sensors 421 and thermostat 422 can be displayed using via display 415. Finally, sensor 407 can detect water near the base of door 401 and sensor 436 can detect heat, smoke, and/or carbon monoxide.

Sensors 418, 419, and 420 can be utilized to provide an indication of when someone has entered or exited an occupied space thru door 401, i.e., by monitoring when door 401 moves between an open and closed position. For example, sensor 418 can indicate when intelligent door 401 opens and closes, sensor 419 can indicate when hatch 409 opens and closes, and air pressure sensor 420 can monitor pressure changes. These sensors can be used in conjunction with internal-facing motion detector 432. Further, one or more of the foregoing sensors can be utilized to calculate door position using the arch vector of the door and other mathematical information.

Intelligent door system can include one or more batteries that can be replaceable and/or rechargeable. The batteries can be accessible from the interior, exterior, and/or both. A user can plug intelligent door 401 into an electrical outlet to charge the batteries, to power intelligent door system and/or to provide a backup power source upon hardwire failure. Intelligent door system can include interior coupling mechanisms, e.g., mounts 430$_a$-430$_n$ to which a cover can be affixed as is described above, to protect intelligent door system from damage.

Figure 5:
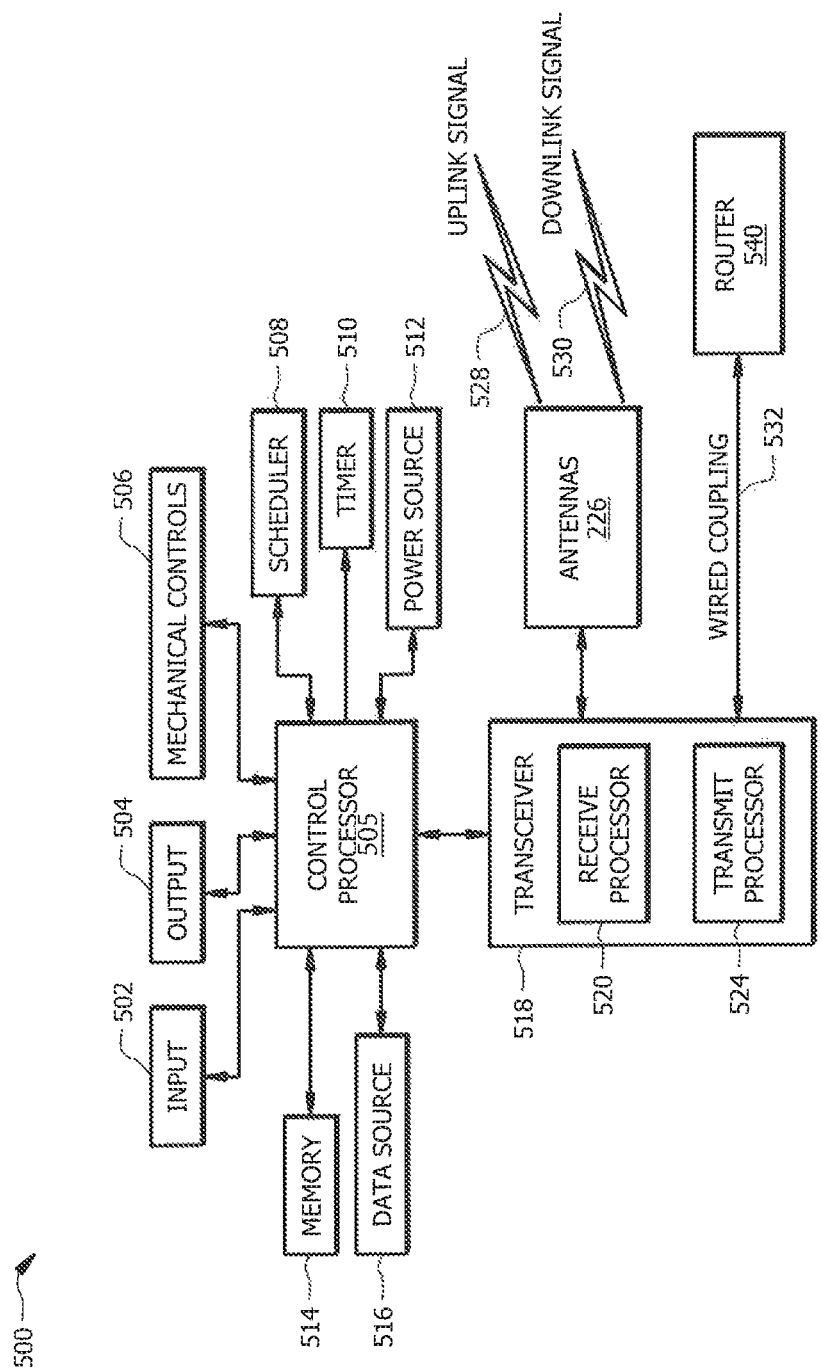
FIG. 5 illustrates certain aspects of an internal control system of an intelligent door system according to described embodiments.

FIG. 5 illustrates certain aspects of an exemplary internal control system that executes instructions to automate, or otherwise perform functions associated with, intelligent door systems described herein. According to FIG. 5, control system includes processor 505, which can correspond to, e.g., processor(s) 105 described with respect to system illustrated at FIG. 1. Consistent with the foregoing description, control system can be included in a HUB or smart HUB and can be a modular component. This allows control system like other intelligent door components, to be easily replaced in the event of malfunction and/or updated with newly released versions.

Processor 505 is communicatively coupled to one or more memory 514 that stores routines (e.g., executable computer programs) and additional data. Processor 505 also couples to one or more inputs 502 and outputs 504 including, but not limited to, keypads, touch screens, switches, buttons, lights, LEDs, microphones, speakers, displays, motion detectors, sensors, cameras, scanners, tactile input and haptic feedback, and the like. Processor 505 further couples to various mechanical controls 506 that actuate mechanical devices (e.g., locks, deadbolts, latches, hinges, handles, camera mounts and/or rotators, and the like). Processor 505 can also include one or more scheduler 508 and one or more timer 510.

Further, the one or more processor 505 receives power from one or more power source 512. Various power sources 512 include, but are not limited to, AC power, DC power, solar power, batteries, kinetic energy, and the like. Processor 505 can be further coupled to one or more transceivers 518 comprising a receive processor 520, transmit processor 524, and antennas 526 that transmit and receive uplink signals 528 and downlink signals 530.

Processor 505 can communicate locally and remotely using various communication mediums, technologies, and networks including, but not limited to, wires, cables, communication busses, lasers, LED transmissions, photo optics, fiber optics, plain old telephone service (POTS) lines, electronic conductors, electromagnetic waves, infrared (IR) communications, radio frequency (RF) communications, satellite communications, Bluetooth, global positioning system (GPS), wide area network (WAN), local area network (LAN), Internet, intranet, Wi-Fi, cellular networks, 3G, 4G, LTE (long term evolution), IoT (internet of things), broadcast radio, microwave radio, microwave cellular, Zigbee, and/or any combination thereof, and the like. Processor 505 can be in communication with a router 540, which can correspond to, e.g., router 109 described with respect to system illustrated at FIG. 1. In embodiments, router 540 can be located within intelligent frame 102 and/or intelligent door 101. Router 540 can couple to a power source and an internet source (e.g., modem). Further, router 540 can be a router/modem combination. In embodiments, some or all wires (e.g., electrical cords, Ethernet cords, and the like), antennas, and the like can be hidden within intelligent frame 102, intelligent door 101 or wall 103 to prevent disconnection, tampering, and the like.

FIG. 6A illustrates an exemplary embodiment of a network 6n which an intelligent door system can communicate. In the illustrated embodiment, intelligent door system serves as a front door of a rental home 601 that is managed by a property manager 650 that manages a plurality of rental properties. Intelligent door system includes router 109, which communicates with an internet service provider (ISP) 631 and provides internet service to rental home 601. Router 109 can receive communications with one or more ISP 631 via hardwire and/or wirelessly (e.g., via base station 630). In embodiments, router 109 can provide internet service to adjacent homes as well, e.g., a neighboring home, a backyard apartment, and the like. Intelligent door system also includes one or more processor(s) 105 supporting wired and wireless communication.

Intelligent door system can communicate with various entities, including but not limited to a user, an administrator, and third parties. In embodiments, a user is an occupant of the room(s) protected by the intelligent door system e.g., a tenant), an administrator can include one or more entities that own and/or operate the intelligent door system e.g., a landlord, property manager, and/or intelligent door service center), and a third party can include service departments, police departments, fire departments, security services, plumbing services, data storage services, data collection/analysis providers, and the like.

FIG. 6A also illustrates various devices that can communicate with intelligent door system using, e.g., a device application. According to an embodiment, intelligent door system can communicate with user devices. Embodiments include a tablet 610, a laptop 605, a smart TV 602, a smartphone 606, a smart watch 607, smart glasses 608, a smart speaker 604$_a$-604$_b$, desktop computer 609, smart appliances (thermostats, HVAC systems, washer/dryers, refrigerators, and the like), key fobs, vehicle communication systems, and the like. Intelligent door system can communicate with admin devices. Embodiments include devices of a property manager 650, including but not limited to, desktop 652, laptop 653, tablet 655, smartphone 654, and the like. Intelligent door system can also communicate with one or more servers 632.

FIG. 6B illustrates generalized aspects of network 6n which an intelligent door system can communicate. Central node 656 can comprise a centralized processor and (e.g., server 632 illustrated in FIG. 6A) that connects various users via wired access and/or wireless access to one or more intelligent door system 1 Central node 656 can have or be coupled to a memory. An owner and/or operator (e.g., landlord) can control intelligent door system via an admin device (e.g., computer 654) executing a device application thereon, which communicates with central node 656. One or more property occupants (e.g., tenants) can control intelligent door system via a user device (e.g., smartphone 606 and/or tablet 610) executing a device application thereon, which communicates with central node 656.

Central node 656 can host one or more intelligent door system accounts. An intelligent door system account can be associated with one or more identified intelligent door systems 1 The account allows one or more users to select and/or create routines (e.g., executable computer programs that cause features of an intelligent door to perform automatic functions). Central node 656 can configure an intelligent door system according to a routine, which can be stored locally and/or remotely to central node 656 and/or intelligent door system. One or more users can access an intelligent door system account using applications, such as a web interface, a smart device app, intelligent door display graphics user interface (GUI), and the like. An application can be accessed via a user device and/or admin device. A user can select a preconfigured routine offered by an application. For example, a user can select an unlock command, which is a routine that unlocks an identified door upon the user selecting the command. In another example, a user can select a fire department routine that automatically calls the fire department upon the intelligent door system detecting a fire.

Further, a user can create a routine by selecting parameters offered by the application and defining the intelligent door system's automation upon satisfaction of the selected parameters. Processor(s) 105 can execute a routine in response to parameters (e.g., rules) of the routine being satisfied. Parameters can include certain received inputs and/or condition detected by a sensor, timer, schedule, camera, etc. Routines can be dynamically configured and can include, but are not limited to, lock/unlock routines, recording routines, user device notification routines, admin device notification routines, server notification routines, logging routines, open/close routines, and diagnostic routines.

For example, a user can create a package delivery routine where, upon satisfaction of the user selected parameters, a hatch unlocks a portal that matches the size of the package being delivered. In this example, a user can select a schedule download parameter that is satisfied upon the downloading of a tracking schedule from a delivery service (e.g., UPS), a scanning parameter that is satisfied upon the scanning of a tracking number that matches a tracking number from UPS, and a timing parameter that is satisfied upon the time matching the tracking schedule from UPS. Upon satisfaction of the selected parameters, the routine can determine the size of the package from information indicated in the tracking schedule and/or the scanned tracking number and unlock a portion of the hatch that accommodates the package.

One or more users can have different access credentials that identify the user and the user's access rights. Access credentials can have classifications, which define a hierarchy of access. For example, access credentials classified as a tenant can have broader access rights than access credentials classified as a landlord. Further, the hierarchy of access can be defined based on the type of routine being configured. For example, when a user is configuring lock/unlock routines, a tenant classification can have broader access rights than access credentials classified as a landlord, while a landlord classification can have broader access rights when configuring emergency routines (e.g., routines that transmit notifications to repair services and/or emergency services).

Further, the hierarchy of access rights can be suspended and/or changed based on a condition and/or event. In embodiments, the occurrence and/or detection of an event can cause a first user of comparatively lower access rights to override a second user of broader access rights (temporarily or otherwise). For example, detection of carbon monoxide can cause a landlord's lock/unlock routines to override a tenant's lock/unlock routines, even if the tenant is classified as having a hierarchically broader access right with regards to lock/unlock routines.

The account can further be used to register one or more devices. Various devices (as shown in FIGS. 6A and 6B) can be registered to communicate with one or more intelligent door systems by providing identification information of the device to the account. In embodiments, a user can select a registration option on a GUI and bring one or more desired devices within proximity of the intelligent door system. Upon selection of the registration option, the GUI can display a list of one or more detected devices, and the user can utilize the GUI to select devices for registration from the displayed list devices. Additionally or alternatively, a user may input identification information of a desired device to register the device.

Various registered devices can be selected to operate as a parameter of a routine. For example, a user can register a key fob 610 and select a routine that causes a smart lock 107 to unlock upon Bluetooth 110 and/or RFID sensor 111 detecting key fob 610. During registration, the one or more devices can be associated with different access credentials. For example, a tenant registered device can be registered to cause a lock/unlock routine at any time, while an admin registered device can be registered to cause a lock/unlock routine upon permission being granted by the tenant via the user application, only during certain times (e.g., during business hours), and the like. In another example, a delivery person can have a registered device that is restricted to only perform a lock/unlock routine, and if selected, upon permission granted by the tenant or property manager—where, e.g., the delivery person's registered device is permitted to be in the area for a certain time before the camera/alarm is activated. Registered devices, and access/control credentials can be stored in memory coupled to processor(s) 105, central node, etc. and/or remotely at another network node, such as a server at a property management center.

Figure 7:
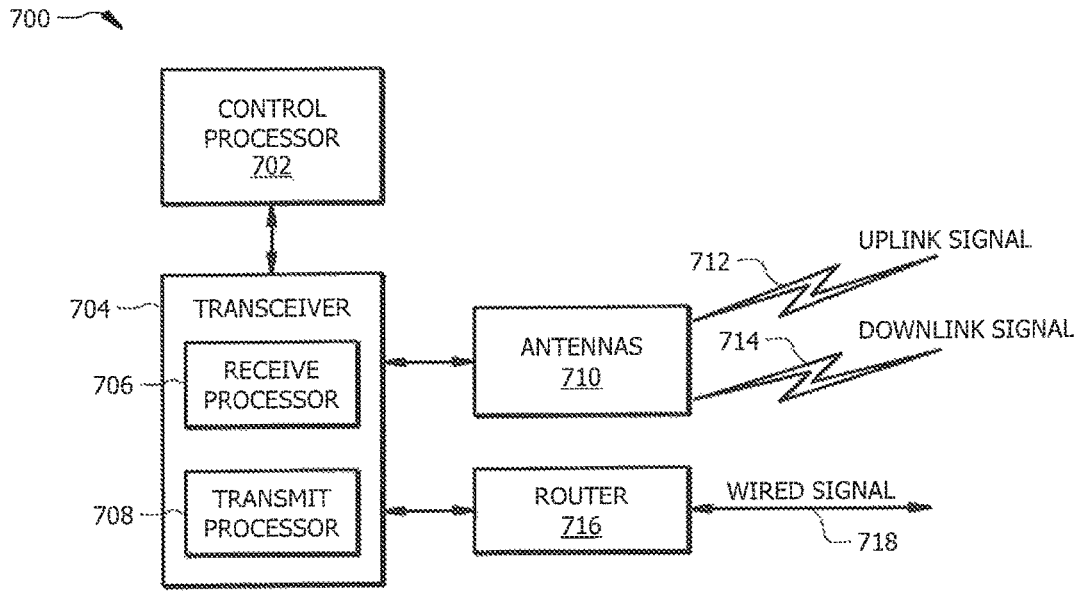
FIG. 7 illustrates certain aspects of a central node in a communication network in which an intelligent door system according to described embodiments operates.

FIG. 7 illustrates certain aspects of exemplary central node according to embodiment described herein. Central node can correspond to, e.g., central node 65 illustrated at FIGS. 6A and 6B. According to FIG. 7, central node includes processor 702, which is communicatively coupled to memory 720. Memory 720 stores routines (e.g., executable instructions), account information of one or more intelligent door system account, and additional data. Processor 702 can be further coupled to one or more transceivers 704 comprising a receive processor 706 and transmit processor 708, each of which can communicate wirelessly according to antennas 710 that transmit and receive uplink signals 712 and downlink signals 714. Wired signals can be communicated using communication link 718.

Processor 702 can communicate locally and remotely using various communication mediums, technologies, and networks including, but not limited to, wires, cables, communication busses, lasers, LED transmissions, photo optics, fiber optics, plain old telephone service (POTS) lines, electronic conductors, electromagnetic waves, infrared (IR) communications, radio frequency (RF) communications, satellite communications, Bluetooth, global positioning system (GPS), wide area network (WAN), local area network (LAN), Internet, intranet, Wi-Fi, cellular networks, 3G, 4G, LTE (long term evolution), IoT (internet of things), broadcast radio, microwave radio, microwave cellular, Zigbee, and/or any combination thereof, and the like. Processor 702 can be in communication with a router 716.

Figure 8:
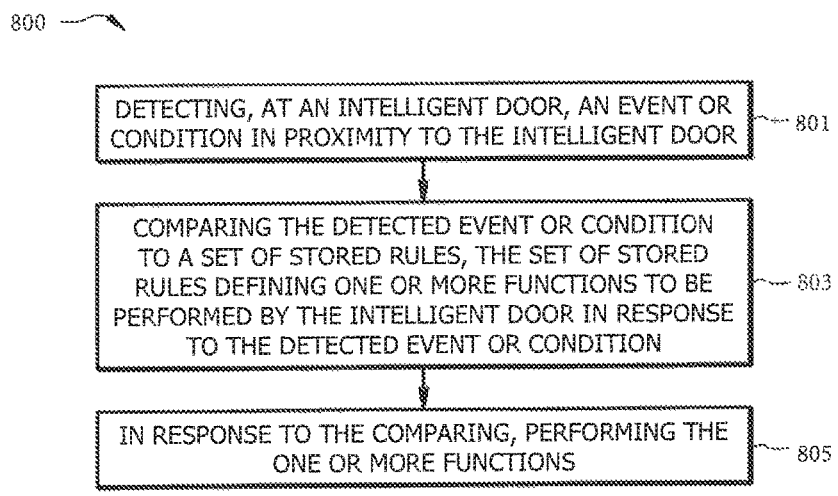
FIG. 8 illustrates aspects of a method performed by an intelligent door system according to described embodiments.

FIG. 8 shows aspects of method that can be performed by systems described herein. Method controls access to one or more rooms using an intelligent door system that operates in response to instructions received from one or more users having different access credentials. In step 801, a first intelligent door sensor detects an event or condition in proximity to the intelligent door. Example events include opening and/or closing of the door, detection of motion, detection of smoke, heat, and/or water. In step 803, a processor of the intelligent door system compares the detected event or condition to a set of stored rules. The set of stored rules define one or more functions to be performed by the intelligent door in response to the detected event or condition.

In step 805, in response to the comparing, the intelligent door performs the one or more functions. For example, the intelligent door can transmit a notification of the detected event or condition to a first user having first access credentials. This notification can be transmitted to an application executing on a mobile device of an occupant. In another example, the intelligent door can transmit a notification of the detected event or condition to a second user having second access credentials. The notification can be sent to a central node in a communication network communicatively coupled to the intelligent door, where the central node is operated by, e.g., a property manager. In another example, the intelligent door system can actuate the intelligent door to an unlocked position for a predetermined period of time. Further, the intelligent door system can instruct a second intelligent door sensor to perform a predefined function. For example, a temperature sensor can be instructed to change the temperature of the one or more rooms. In another example, an intelligent door camera can be instructed to record for a certain time period upon detection of an event or condition for a certain time period. The recording, portions of the record, of image data from the record can be processed and transmitted to one or more users, including a property manager, hotel management system, or resident or tenant.

Figure 9:
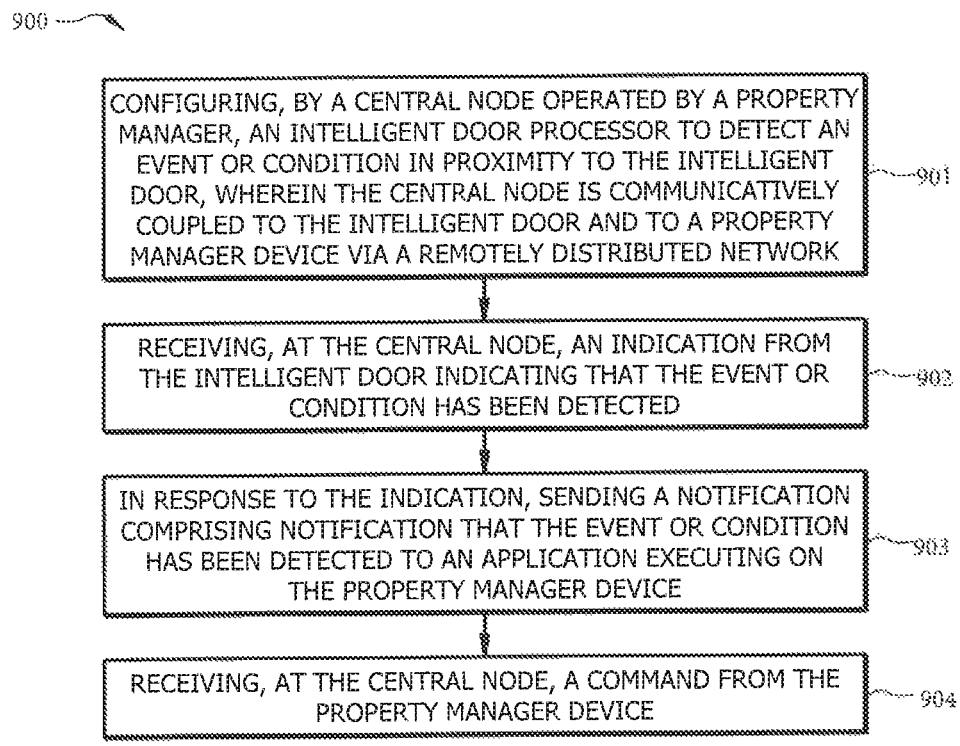
FIG. 9 illustrates aspects of another method performed by an intelligent door system according to described embodiments.

FIG. 9 shows aspects of method that can be performed by systems described herein. Method controls access to one or more rooms using an intelligent door that operates in response to instructions received from one or more users having different access credentials.

At step 901 a central node operated by a property manager configures an intelligent door processor to detect an event or condition in proximity to the intelligent door. In embodiments, the central node is communicatively coupled to the intelligent door and to a property manager device via a remotely distributed network.

At step 903, the central node receives an indication from the intelligent door indicating that the event or condition has been detected.

At step 905, in response to the indication, a notification is sent to an application executing on the property manager device indicating that the event or condition has been detected.

At step 907, the central node receives a command from the property manager device. The command can instruct the intelligent door to unlock at least one lock of the intelligent door. In embodiments, the smart lock can be unlocked and/or portions of the hatch can be unlocked. The command can instruct the intelligent door to unlock a hatch lock to receive an item from a third party upon confirmation of delivery tracking information from a delivery service. Further, the command can instruct the intelligent door to unlock a door lock to receive a service person upon identification confirmation of the service person.

According to certain aspects, a command can cause one or more users to receive an alert. For example, the central node can transmit notifications to one or more mobile devices of the one or more occupants. Further, the intelligent door can trigger at least one of: a visual alert, an audio alert, and a tactile alert.

According to other aspects, a command can also activate one or more recording device for a certain period of time. For example, the intelligent door can activate at least one recording device for a certain period of time to record and/or transmit information to the central node. Example recording devices include one or more video cameras and one or more microphones.

Figure 10:
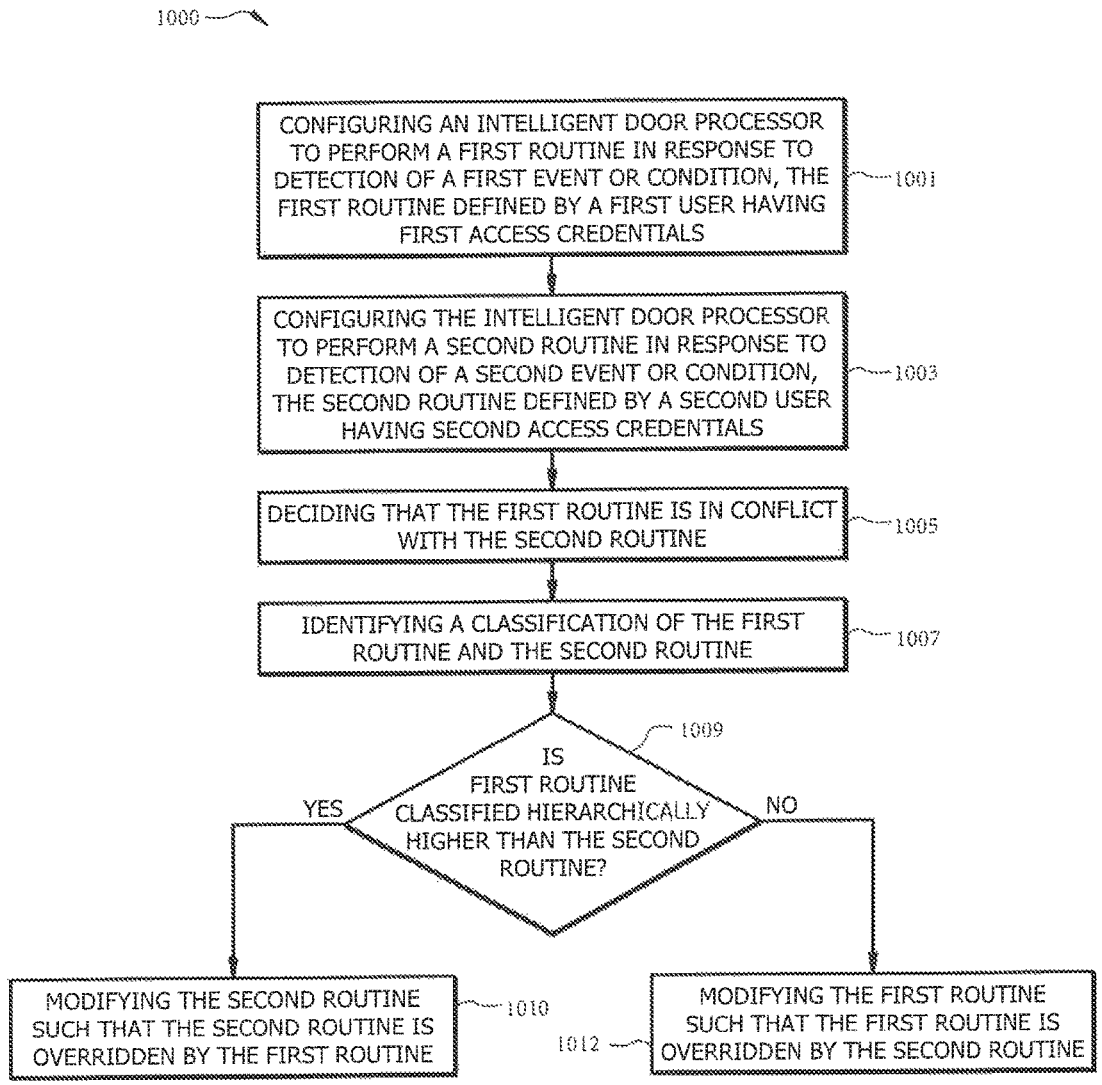
FIG. 10 illustrates aspects of another method performed by an intelligent door system according to described embodiments.

FIG. 10 shows aspects of method 1000 that can be performed by systems described herein. Method controls access to one or more rooms using an intelligent door that operates in response to instructions received from one or more users having different access credentials.

At step 1003 an intelligent door processor is configured to perform a first routine in response to detection of a first event or condition. The first routine is defined by a first user having first access credentials.

At step 1005 the intelligent door processor is configured to perform a second routine in response to detection of a second event or condition. The second routine is defined by a second user having second access credentials.

At step 1007 a processor decides that the first routine is in conflict with the second routine.

At step 1001 the processor identifies the classification of the first routine and the second routine.

At 1009 the processor determines whether the first routine is classified hierarchically higher than the second routine. This determination can be based on the classification of the user credentials of the user that selected and/or created the routine. Additionally or alternatively, the determination can be based at least on events, conditions, circumstances detected at the time of the determination. Additionally or alternatively, the determination can be based at least on the type of the routine in conjunction with the classification of the user credentials of the user that selected and/or created the routine.

If the first routine is classified hierarchically higher than the second routine, then at step 1010 the second routine is modified such that the first routine overrides the second routine.

If the second routine is classified hierarchically higher than the first routine, then at step 1012 the first routine is modified such that the second routine overrides the first routine.

In certain embodiments, information is received in response to performance of the first routine, and the information is not accessible by the tenant. In embodiments, information is received in response to performance of the second routine, and the information is not accessible by the landlord.

A central node and/or intelligent door system receives scheduling information from one or more landlord calendar and the scheduling information satisfies a selected parameter of the first routine. Further, another parameters of the first routine is satisfied when an agent identifies itself at the intelligent door as an agent that matches the scheduling information received from the landlord calendar. In embodiments, a central node and/or intelligent door system receives scheduling information from one or more tenant calendar and the scheduling information satisfies one of the selected parameters of the second routine. Further, another parameter of the second routine is satisfied when an agent identifies himself at the intelligent door as an agent that matches the scheduling information received from the tenant calendar.

Additionally or alternatively, a central node and/or intelligent door system receives tracking information from a tracking application and tracking information satisfies one of the selected parameters of the first and/or second routines. In this embodiment, another parameter of the routine can be satisfied when a scanned tracking code includes coded information that matches the tracking information received from the tracking application. Performance of at least one of the first and the second routines can cause the processor of the intelligent door to unlock a hatch of the intelligent door. Further, performance of at least one of the first and the second routines cause the processor of the intelligent door to transmit a notification to a third party service—where example third party services include, but are not limited to, a plumber service, a maintenance service, a cleaning service, and a de-icing service.

Those of skill in the art would understand that information and signals can be represented using any of a variety of different technologies and techniques. According to an embodiment, data, instructions, commands, information, signals, bits, symbols, and chips that can be referenced throughout the above description can be represented by voltages, currents, electromagnetic waves, magnetic fields or particles, optical fields or particles, or any combination thereof.

The functional blocks and modules in the FIGURES can comprise processors, electronics devices, hardware devices, electronics components, logical circuits, memories, software codes, firmware codes, etc., or any combination thereof.

Those of skill in the art would further appreciate that the various illustrative logical blocks, modules, circuits, and algorithm steps described in connection with the disclosure herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure. Skilled artisans will also readily recognize that the order or combination of components, methods, or interactions that are described herein are merely embodiments and that the components, methods, or interactions of the various aspects of the present disclosure can be combined or performed in ways other than those illustrated and described herein.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. Computer-readable storage media can be any available media that can be accessed by a general purpose or special purpose computer. By way of embodiment, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection can be properly termed a computer-readable medium. According to an embodiment, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and Blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein can be utilized according to the present invention. Accordingly, the appended claims are intended to include within their scope such processes, machines, manufacture, compositions of matter, means, methods, or steps.

The invention claimed is:

1. A method for controlling access to one or more rooms using an intelligent door that operates, at least in part, in response to access credentials of one or more users, the method comprising:
configuring an intelligent door processor to perform a first routine in response to detection of a first event or condition, the first routine defined according to first access credentials of a first user;
configuring the intelligent door processor to perform a second routine in response to detection of a second event or condition, the second routine defined according to second access credentials of a second user;
receiving from the intelligent door processor:
a notification of performance of the first routine in response to detection of the first event or condition by the first user, or
a notification of performance of the second routine in response to detection of the second event or condition by the second user;
determining that the first routine is in conflict with the second routine;
identifying a classification of the first routine;
identifying a classification of the second routine;

based on the classification of the first routine and the classification of the second routine, overriding the second routine and performing the first routine.

2. The method of claim 1 where performance of at least the first routine and the second routine causes the processor of the intelligent door to unlock a hatch of the intelligent door.

3. The method of claim 1 where performance of at least the first routine and the second routine causes the processor of the intelligent door to transmit a notification to a third party service.

4. A system for controlling access to one or more rooms using an intelligent door that operates in response to instructions received from one or more users having different access credentials, the system comprising:
 a memory;
 an intelligent door processor communicatively coupled to the memory, where the intelligent door processor is configured to
  perform a first routine in response to detection of a first event or condition, the first routine defined according to first access credentials of a first user;
  perform a second routine in response to detection of a second event or condition, according to second access credentials of a second user;
   transmit a notification of performance of the first routine in response to detection of the first event or condition to the first user, or
   transmit a notification of performance of the second routine in response to detection of the second event or condition to the second user;
  determine that the first routine is in conflict with the second routine;
  identify a classification of the first routine;
  identify a classification of the second routine;
  based on the classification of the first routine and the classification of the second routine, overriding the second routine and performing the first routine.

5. The system of claim 4 where the processor is further configured to unlock a hatch of the intelligent door in response to detection of the first event or condition or the second event or condition.

6. The system of claim 4 where the processor is further configured to transmit a notification to a third party service in response to detection of the first event or condition or the second event or condition.

7. A method for controlling access to one or more rooms using an intelligent door that performs a routine in response to detection of an event or a condition, the method comprising:
 receiving, from an intelligent door comprising a processor configured to perform a first routine in response to detection of a first event or condition and perform a second routine in response to detection of a second event or condition, at least one of:
  a notice of performance of the first routine in response to detection of the first event or condition, and
  a notice of performance of the second routine in response to detection of the second event or condition;
 determining that the first routine is in conflict with the second routine; and
 based on a classification of the first routine and a classification of the second routine, overriding the second routine and performing the first routine.

8. The method of claim 7 where performance of the first routine comprises:
 the processor of the intelligent door unlocking the intelligent door.

9. The method of claim 8 where performance of the first routine further comprises:
 the processor of the intelligent door transmitting a notification of performance of the first routine to a third party service.

10. A system for controlling access to one or more rooms using an intelligent door that performs a routine in response to detection of an event or a condition, the system comprising:
 a memory;
 an intelligent door processor communicatively coupled to the memory, where the intelligent door processor is configured to:
  perform at least a first routine in response to detection of a first event or condition;
  perform at least a second routine in response to detection of a second event or condition;
  transmit at least one of:
   a notification of performance of the first routine in response to detection of the first event or condition, and
   a notification of performance of the second routine in response to detection of the second event or condition;
  determine that the first routine is in conflict with the second routine; and
  based on a classification of the first routine and a classification of the second routine, overriding the second routine and performing the first routine.

11. The system of claim 10 where the processor is further configured to unlock the intelligent door when performing the first routine.

12. The system of claim 11 where the processor is further configured to transmit a notification of performance of the first routine to a third party service.

* * * * *